United States Patent
Oka et al.

(10) Patent No.: US 10,122,314 B2
(45) Date of Patent: Nov. 6, 2018

(54) MOTOR CONTROL APPARATUS, MOTOR CONTROL SYSTEM, MOTOR CONTROL METHOD

(71) Applicant: Kabushiki Kaisha Yaskawa Denki, Kitakyushu-shi (JP)

(72) Inventors: Yusuke Oka, Kitakyushu (JP); Tadashi Okubo, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 31 days.

(21) Appl. No.: 15/263,794

(22) Filed: Sep. 13, 2016

(65) Prior Publication Data

US 2016/0380573 A1 Dec. 29, 2016

Related U.S. Application Data (63) Continuation of application No. PCT/JP2014/056746, filed on Mar. 13, 2014.

(51) Int. Cl.
*H02P 1/00* (2006.01)
*H02P 27/08* (2006.01)
*H02P 29/02* (2016.01)
*H02P 6/00* (2016.01)
*H02P 6/08* (2016.01)

(52) U.S. Cl.
CPC .............. *H02P 27/08* (2013.01); *H02P 6/006* (2013.01); *H02P 6/08* (2013.01); *H02P 29/02* (2013.01)

(58) Field of Classification Search
USPC ..... 318/505, 568.17, 400.33, 721, 823, 282, 318/568.25, 6
See application file for complete search history.

(56) References Cited

U.S. PATENT DOCUMENTS 5,691,613 A 11/1997 Gutwillinger
8,013,561 B2 * 9/2011 Gan ........................ H02K 24/00
318/480
2002/0167289 A1 11/2002 Nakatsugawa et al.

FOREIGN PATENT DOCUMENTS

| CN | 101673983 A | 3/2010 |
|---|---|---|
| DE | 10 2010 024 688 A1 | 12/2011 |
| EP | 1 257 049 A2 | 11/2002 |
| JP | H07-075359 A | 3/1995 |
| JP | H08-336290 A | 12/1996 |

(Continued)

OTHER PUBLICATIONS

Office Action dated Dec. 20, 2017 in Patent Application No. 2016-507208, 3 pages.

(Continued)

*Primary Examiner* — Eduardo Colon Santana
*Assistant Examiner* — Iftekhar Mustafa
(74) *Attorney, Agent, or Firm* — Oblon, McClelland, Maier & Neustadt, L.L.P.

(57) ABSTRACT

A motor control apparatus for controlling driving of a motor includes an inverter which supplies power to a motor having a position detector, and circuitry which controls power conversion of the inverter based on at one or more predetermined control parameters, determine a type of the motor based on a signal received from the position detector of the motor, and control notification of setting confirmation of one or more of the predetermined control parameters in accordance with the type of the motor.

18 Claims, 5 Drawing Sheets

(56) References Cited

FOREIGN PATENT DOCUMENTS

| JP | 10-333551 A | 12/1998 |
|---|---|---|
| JP | 2002-095289 A | 3/2002 |
| JP | 2002095289 A * | 3/2002 |
| JP | 2002-315376 A | 10/2002 |
| JP | 2002315376 A * | 10/2002 |
| JP | 2003-102195 A | 4/2003 |
| JP | 2005261198 A * | 9/2005 |

OTHER PUBLICATIONS

Extended European Search Report dated Sep. 28, 2017 in Patent Application No. 14885405.2.
Japanese Office Action dated Jun. 23, 2017 in Patent Application No. 2016-507208.
English Translation of the International Preliminary Report on Patentability and Written Opinion dated Sep. 22, 2016 in PCT/JP2014/056746.
International Search Report and Written Opinion dated May 13, 2014 in PCT/JP2014/056746, filed Mar. 13, 2014.
Combined Office Action and Search Report dated Feb. 11, 2018 in Chinese Patent Application No. 201480076771.7 (with English language translation) citing document AO therein, 17 pages.
Office Action issued Aug. 2, 2018 in corresponding Chinese Application No. 201480076771, dated Mar. 13, 2014 (with English-language Translation), 14 pages.

* cited by examiner

| CONTROL PARAMETER NAME | BEFORE CHANGE : ROTATION TYPE | | AFTER CHANGE : LINEAR TYPE | |
|---|---|---|---|---|
| ·SET SPEED | Pn301= | 500 min$^{-1}$ | Pn401= | 200 mm/sec |
| ·MAXIMUM SPEED | Pn302= | 1500 min$^{-1}$ | Pn402= | 600 mm/sec |
| ·MINIMUM SPEED | Pn303= | 50 min$^{-1}$ | Pn403= | 20 mm/sec |
| ·ENCODER RESOLUTION | Pn304= | 3600 pulse/rev | | — |
| ·LINEAR SCALE PITCH | | — | Pn404= | pulse/mm |
| ·SPEED LOOP GAIN | Pn305= | 800 Hz | Pn405= | 650 Hz |
| ·SPEED LOOP INTEGRAL TIME | Pn306= | 3×10$^{-5}$ sec | Pn406= | 2×10$^{-5}$ sec |
| ·JOG SPEED | Pn307= | 100 min$^{-1}$ | Pn407= | 40 mm/sec |
| ·LOAD LEVEL | Pn308= | 120 Nm | Pn408= | 100 Nm |

ROTATION TYPE → LINEAR TYPE : MOTOR TYPE CHANGE NOTIFICATION SCREEN

ROTATION TYPE WILL BE CHANGED TO LINEAR TYPE.
ARE YOU SURE PARAMETER SETTING IS READY?

TYPE CHANGE NOTIFICATION RELEASE — 41

MOTOR CONTROL APPARATUS, MOTOR CONTROL SYSTEM, MOTOR CONTROL METHOD

CROSS-REFERENCE TO RELATED APPLICATION

This is a continuation application of PCT/JP2014/056746, filed Mar. 13, 2014, which was published under PCT article 21(2). The entire contents of this application are incorporated herein by reference.

BACKGROUND OF THE INVENTION

Field of the Invention

Embodiments disclosed herein relate to a motor control apparatus, a motor control system, and a motor control method.

Description of Background Art

To adapt to motor information such as electric properties, mechanical properties, and specification of a motor, a motor type may be automatically determined and motor setting of motor control means may be automatically changed.

SUMMARY OF THE INVENTION

According to one aspect of the present invention, a motor control apparatus for controlling driving of a motor includes an inverter which supplies power to a motor having a position detector, and circuitry which controls power conversion of the inverter based on at one or more predetermined control parameters, determine a type of the motor based on a signal received from the position detector of the motor, and control notification of setting confirmation of one or more of the predetermined control parameters in accordance with the type of the motor.

According to another aspect of the present invention, a motor control system includes a motor having a position detector, and a motor control apparatus which controls driving of the motor and including an inverter and circuitry. The inverter supplies power to the motor having the position detector, and the circuitry controls power conversion of the inverter based on one or more predetermined control parameters, determines a type of the motor based on a signal received from the position detector of the motor, and controls notification of setting confirmation of one or more of the predetermined control parameters in accordance with the type of the motor.

According to yet another aspect of the present invention, a motor control method for controlling driving of a motor includes controlling power conversion of an inverter based on one or more predetermined control parameters, determining a type of a motor based on a signal received from a position detector of the motor, and controlling notification of setting confirmation of one or more of the predetermined control parameters in accordance with the type of the motor determined. The inverter supplies power to the motor having the position detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

First, an exemplary configuration of a motor control system according to an embodiment of the present invention will be described referring to FIG. 1.

Figure 1:
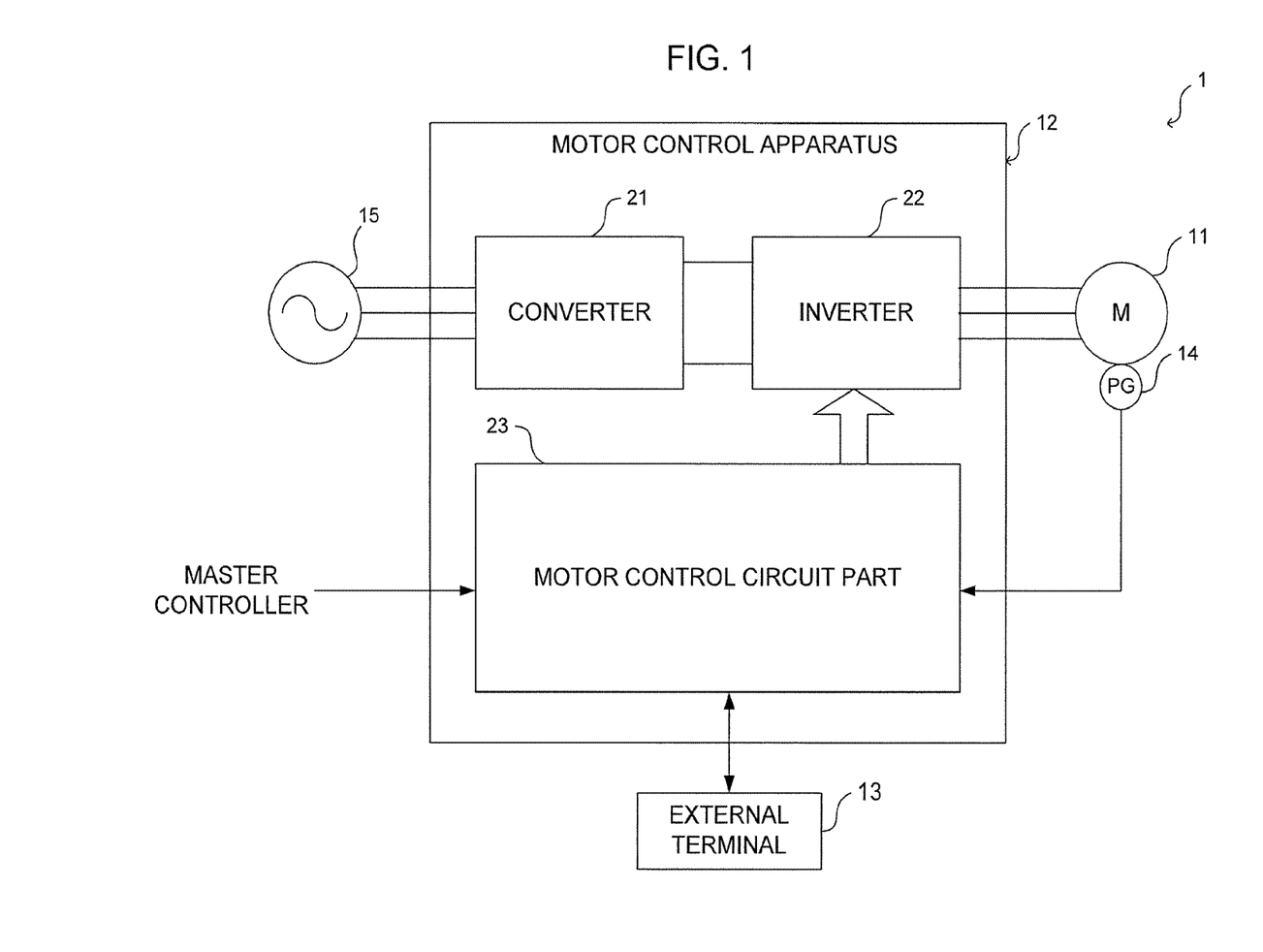
FIG. 1 is a block diagram showing an exemplary configuration of a motor control system of an embodiment.

FIG. 1 is a block diagram schematically showing a hardware configuration of the motor control system of the present embodiment. As FIG. 1 shows, a motor control system 1 includes a motor 11, a motor control apparatus 12, and an external terminal 13.

The motor 11 is an electric motor which is driven by electric power fed from the motor control apparatus 12 to be described later (hereinafter referred to as supply power) so as to convert the energy into mechanical force and displacement. The motor of various types, for example, rotation type, linear motion type, synchronous type, and induction type may be applied in accordance with variety of mechanical configuration and electromagnetic operation mode. The present embodiment will be described by taking the case of compatibly connecting and applying any one of two types of the motor 11, that is, the rotation type for generating torque and rotary displacement, and the linear type (linear motion type) for generating thrust and linear displacement as an example. Those motors of both types are driven by the three-phase AC power to ensure compatibility in connection to the motor control apparatus 12 by sharing specifications of wiring and connector for power supply. Any of those types of the motor 11 includes a position detector 14 capable of detecting the output displacement and the type of the motor 11. In the following description, particularly, the position detector 14 of the rotation type motor is referred to as an encoder, and the position detector 14 of the linear motion type motor is referred to as a linear scale.

The motor control apparatus 12 appropriately converts the AC power supplied from an AC power supply 15 into supply power to supply it to the motor 11, and controlling driving of the motor 11. The motor control apparatus 12 mainly includes a converter 21, an inverter 22, and a motor control circuit part 23.

The converter 21 converts the AC power fed from the AC power supply 15 into predetermined DC power by a rectification circuit and a smoothing circuit which are contained in the converter 21 and not particularly shown. The inverter 22 switches a bridge circuit constituted by semiconductor switching elements which are contained in the inverter 22 and not particularly shown, to thereby convert the DC power fed from the converter 21 into the predetermined supply power and supply it to the motor 11. The motor control circuit part 23 controls power conversion performed by the inverter 22 based on an instruction from a not particularly shown master controller, and a detection signal of the output displacement from the position detector 14 of the motor 11. A detailed configuration of an exemplary motor control circuit part 23 will be described later by referring to FIG. 5.

The external terminal 13 is constituted, for example, by a general purpose personal computer, and an engineering tool separated from the motor control apparatus 12, and transmits and receives various types of information by externally connecting to the motor control apparatus 12. The external terminal 13 including a display unit (notification part) and an operation part (both units are not shown) displays a motor type change notification screen (see FIG. 3 to be described later) on the display unit based on the information received from the motor control apparatus 12 upon execution of the notification control to be described later, and transmits the release signal of the notification control and the setting information of the respective control parameters to the motor control apparatus 12 based on the input operation from the user via the operation part. The external terminal 13 is connected to the motor control apparatus 12 only in the case of executing the special process such as the notification control as described above. It is not necessary to connect the terminal to the motor control apparatus 12 in the normal operation.

As described above, the motor 11 has multiple types, for example, rotation type and linear motion type, or synchronous type and induction type, which are different from one another in the mechanical configuration and the electromagnetic operation mode. In the exemplary case of the present embodiment, the single motor control apparatus 12 is commonly used for any one of two types of the motor, the rotation type and linear motion type, and appropriately controls these types, respectively. In such a case, from the hardware point of view, the configuration of the motor control apparatus 12 as shown in FIG. 1 is required in common for controlling any of the types of the motor 11. However, from the software point of view, among many control parameters and many control program modules to be applied in the power conversion control of the motor control circuit part 23, there are an exclusive control parameter and an exclusive control program module which are required to be differently set adapted to the respective motor types (or uniquely required only for the predetermined type). In order to allow the same motor control apparatus 12 to control multiple types of the motor 11 adaptively, the exclusive control parameters unique to each type of the motor to be applied are set for selective use together with the exclusive control program module.

However, in the case that the type of the motor 11 to be connected to, for example, the motor control apparatus 12 for the test machine use is frequently changed, there may be possibilities that the user changes only the exclusive control program module while forgetting changing the exclusive control parameter, or applies the exclusive control parameters with the contents kept unset as the motor type has not been connected, while keeping the unset state.

On the contrary, the present embodiment is structured to determine the type of the motor 11 based on the signal received by the motor control circuit part 23 from the position detector 14 of the motor 11. The notification about setting confirmation of the predetermined control parameter is performed in accordance with the type of the motor 11 determined by the motor control circuit part 23. As a result, the motor control apparatus 12 of the present embodiment is allowed to prompt the user to confirm setting of the control parameter adapted to the type of the connected motor 11, thus avoiding erroneous control.

Hereinafter, an exemplary configuration of the motor control circuit part 23 will be described.

The motor control circuit part 23 controls power conversion of the inverter 22 based on the instruction from the master controller and the predetermined control parameter, determines the type of the motor 11 based on the signal received from the position detector 14, and performs notification about setting confirmation of the predetermined control parameter in accordance with the determined type of the motor 11. Hereinafter, referring to FIG. 2, the configuration of the motor control circuit part 23 will be described by taking the example of implementation by the functional block as the specific example.

Figure 2:
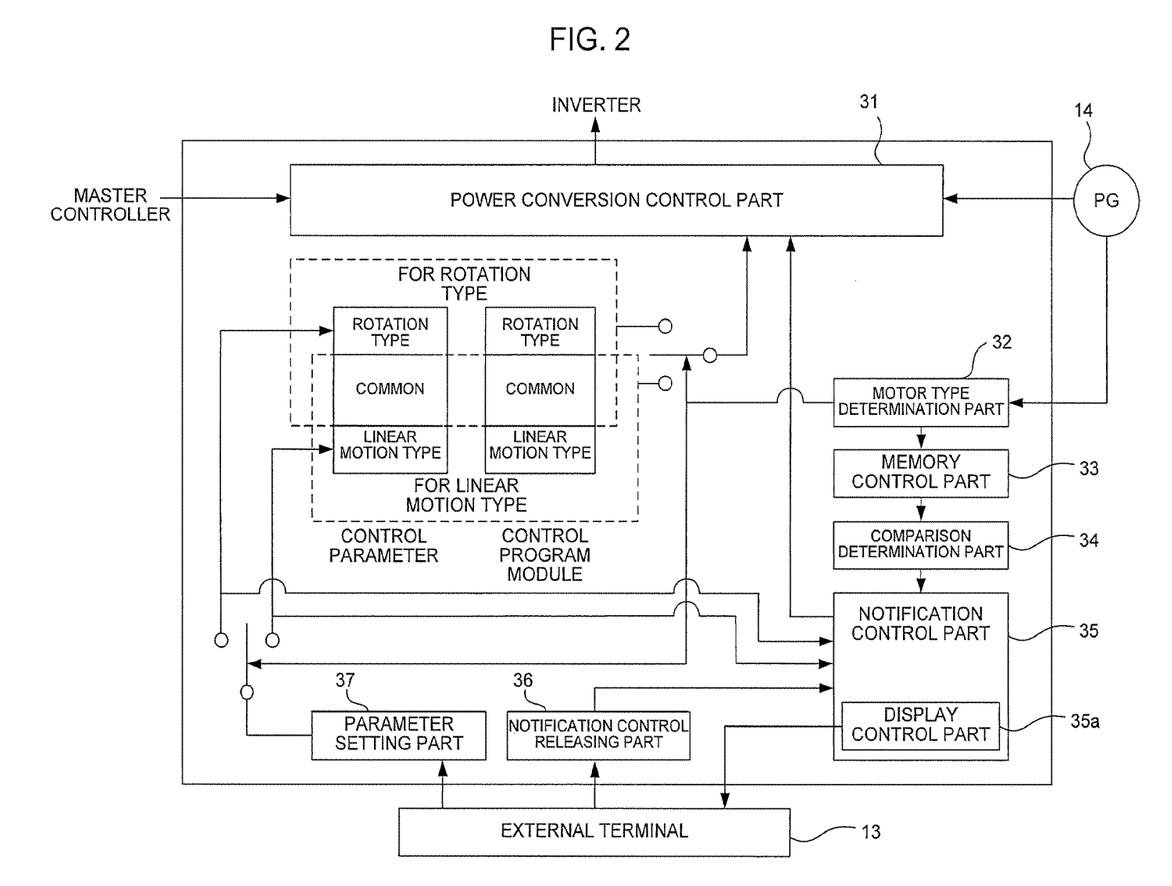
FIG. 2 is a software block diagram schematically showing contents of a process executed by a motor control circuit part.

FIG. 2 is a software block diagram schematically showing contents of the process executed by the motor control circuit part 23. As FIG. 2 shows, the configuration of the contents of the process executed by the motor control circuit part 23 includes a power conversion control part 31, a motor type determination part 32, a memory control part 33, a comparison determination part 34, a notification control part 35, a notification control releasing part 36, and a parameter setting part 37. The respective parts are implemented by the program executed by a CPU 901 (see FIG. 5 to be described later) of the motor control circuit part 23.

The power conversion control part 31 performs the power conversion control under predetermined loop control and PWM control, for example, based on the instruction input from the master controller such as the position instruction and the speed instruction, and the detection signal of the output displacement of the motor 11 input from the position detector 14. On the basis of the power conversion control, a switching signal of the semiconductor switching element disposed inside the inverter 22 is output to the inverter 22 so as to control the power supply to the motor 11. The power conversion control process is executed by the power conversion control part 31 based on the control program module and the control parameter. The common control program module and the common control parameter which can be commonly applied to any type of the motor constitute most part of those control program modules and the control parameters. However, there may exist the exclusive control program module and the exclusive control parameter among those described above, which are required to be executed and set adapted to the motor of rotation type. There may also exist the exclusive control program module and the exclusive control parameter which are required to be executed and set adapted to the motor of linear type.

The exclusive control program module and the exclusive control parameters for the respective types may be required to be set to have different contents adapted to the different unit for output (for example, the number of rotations and the linear displacement) for each type of the motor. There may be another case that they are uniquely required by any one of those types. Application of the control program module and the control parameter by the power conversion control part 31 for the motor may be switched between the rotation type and the linear type based on the result of the motor type determination by the motor type determination part 32 to be described later.

The motor type determination part 32 receives the information signal concerning the type of the motor 11 from the position detector 14 disposed in the motor 11, and determines the type of the currently connected motor 11 based on the contents of the signal. An exemplary case of the present embodiment allows the position detector 14 to automatically output the information signal concerning the motor type at a timing of the power on. On the basis of the information signal, the motor type determination part 32 determines the motor type. Alternatively, it may be structured to allow the motor type determination part 32 to transmit a request signal to the position detector 14 via a different signal line, and to receive the information concerning the motor type as a reply.

The memory control part 33 which includes a not shown non-volatile memory therein records the historical information having all determination results accumulated in chronological order in the non-volatile memory for each determination of the motor type executed by the motor type determination part 32.

The comparison determination part 34 compares the determination result of the currently connected motor type with the previous motor type among those recorded as historical information in the non-volatile memory of the memory control part 33 to determine whether or not those types match.

In the case that the comparison determination part 34 outputs the determination results indicating that those types do not match, the notification control part 35 executes the notification control about setting confirmation of the exclusive control parameter adapted to the type of the currently connected motor 11. In the example according to the present embodiment, the notification control serves to notify the user of necessity of setting confirmation of the exclusive control parameter by sounding an alarm. The respective exclusive control parameters for the currently set rotation type and the linear type are acquired to display the exclusive control parameters for the respective types on the display unit of the externally connected external terminal 13 in contrast (see motor type change notification screen of FIG. 3 to be described later). A display control part (35*a*) provided inside the notification control part 35 displays the notification contents. The notification control part 35 controls the power conversion control part 31 not to execute the power conversion control unless the notification control during execution is released.

The notification control releasing part 36 allows the notification control part 35 to release the notification control upon reception of the notification release signal from the external terminal 13.

On the basis of an input operation by the user via the operation part of the external terminal 13, the parameter setting part 37 sets contents of the exclusive control parameters for the currently connected motor type. Based on the motor type determination result by the motor type determination part 32, the parameter setting part 37 switches setting of the exclusive control parameter between the rotation type and the linear type.

The each process in the motor control circuit part 23 is not limited to an example case of the shared process. For example, the process may be performed by the single processing unit, or by further subdivided processing units.

In the present embodiment, a case that the each process in the motor control circuit part 23 is implemented by the program executed by the CPU 901 will be described. However, the each process may be partially or totally implemented by the actual devices such as ASIC, FPGA, and any other electric circuit.

Figure 3:
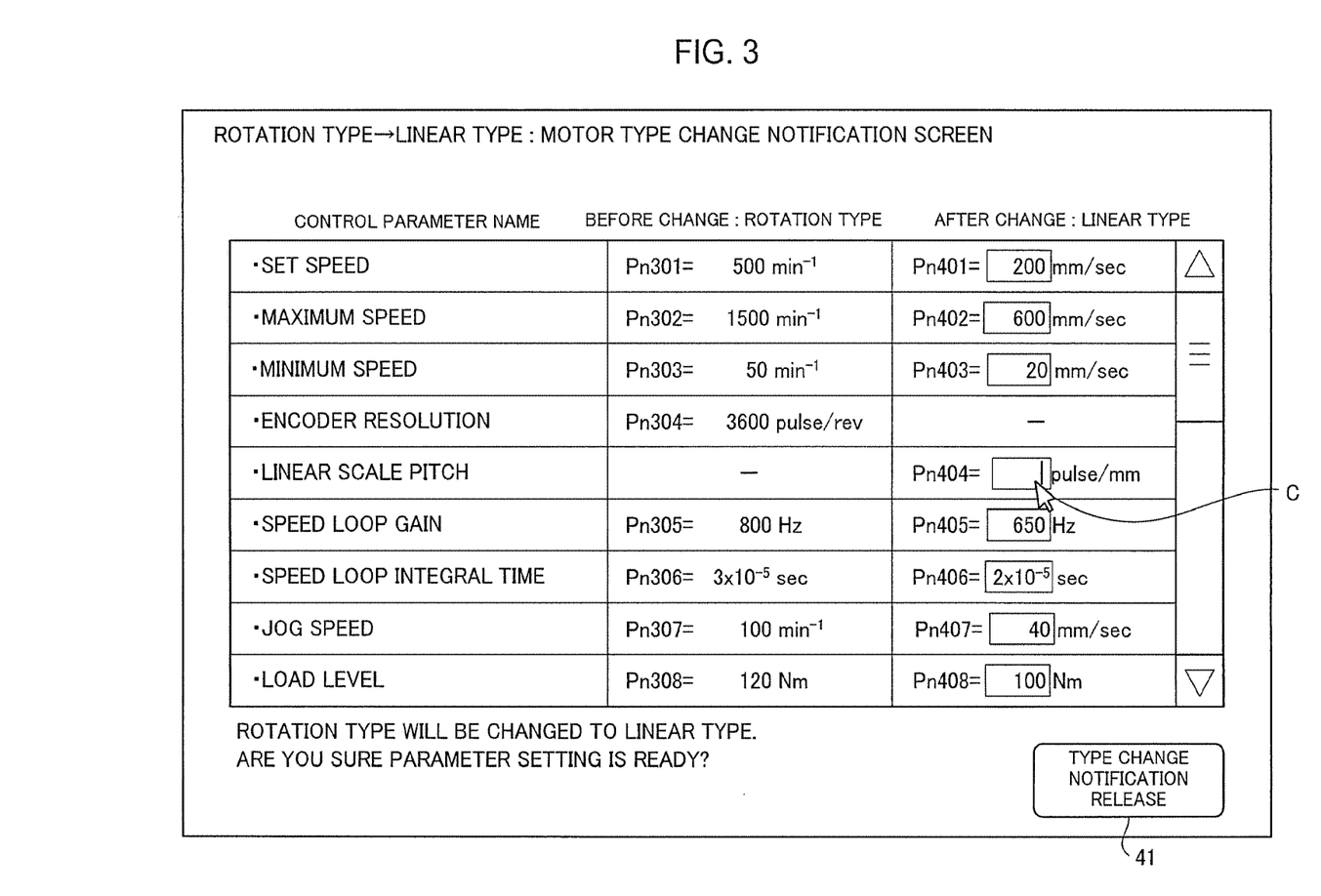
FIG. 3 is a view showing an example of a motor type change notification screen displayed on a display unit of an external terminal.

FIG. 3 shows an example of the motor type change notification screen displayed on the display unit of the external terminal 13 by the display control part (35*a*) of the notification control part 35. In the example shown in the drawing, the display of the external terminal 13 constituted by the general purpose personal computer serves as the display unit, and the motor type change notification screen is displayed via so-called GUI (Graphical User Interface) display.

An example of FIG. 3 indicates a case that the motor type has been changed from the previously determined rotation type to the currently determined linear type. Referring to the motor type change notification screen as shown in the drawing, nine of a large number of exclusive control parameters are listed, presenting set values adapted to the rotation type before change and the linear type after change to the each exclusive control parameter, respectively in contrast. As for the exclusive control parameters uniquely set only for one of the motor types (encoder resolution, linear scale pitch as the example shown in the drawing), the set contents adapted to the other motor type will be displayed with blank. Though not particularly illustrated, in the case that the currently determined motor type has been never connected, and set values for the corresponding exclusive control parameters are not set, those set values for all the exclusive control parameters will be displayed with blank. The respective set values will be displayed together with the parameter number (a value written as "Pn" in the drawing) as the identification information of the set values for the respective control parameters, and units for the respective set values (for example, "min$^{-1}$" in the drawing).

As for the set value of the exclusive control parameter adapted to the motor type after change, contents of the value may be newly set and input by the user through the predetermined input operation by moving the cursor (C) over the corresponding display point (see the display of set value on the linear scale pitch in the drawing). The external terminal 13 transmits the thus input set values to the parameter setting part 37 so that the values are stored in an appropriate storage area in the motor control circuit part 23. In the input of this exclusive control parameter setting, it is possible not only to initially set values for the exclusive control parameters which have been kept unset, but also to correct the set value for the already set exclusive control parameters. There is the case that the same type of the motor 11 may be subdivided into models each with different capacity. However, the number of such models (range) which can be controlled for driving by the same motor control apparatus 12 is restricted. The different models of the motor 11 may be allowed to share the set values for the same exclusive control parameters so long as the motor type is the same. In other words, once the exclusive control parameters are set for the same motor type, resetting of such parameters for the different model is not necessary.

The user operates the notification releasing operation (pressing the "type change notification release" button 41 in the example shown in the drawing) in the state where all the exclusive control parameter values are set so that the external terminal 13 transmits the release signal to the notification control releasing part 36 of the motor control circuit part 23. As a result, the notification control is released for the first time, to allow the power conversion control part 31 to execute the power conversion control. In other words, the drive control of the motor 11 may be executed by the motor control apparatus 12.

Subsequently, referring to FIG. 4, an example of the control process of the start-up process including the notification control executed by the motor control circuit part 23 will be described. Execution of the start-up process is started when power of the motor control apparatus 12 is turned on.

Figure 4:
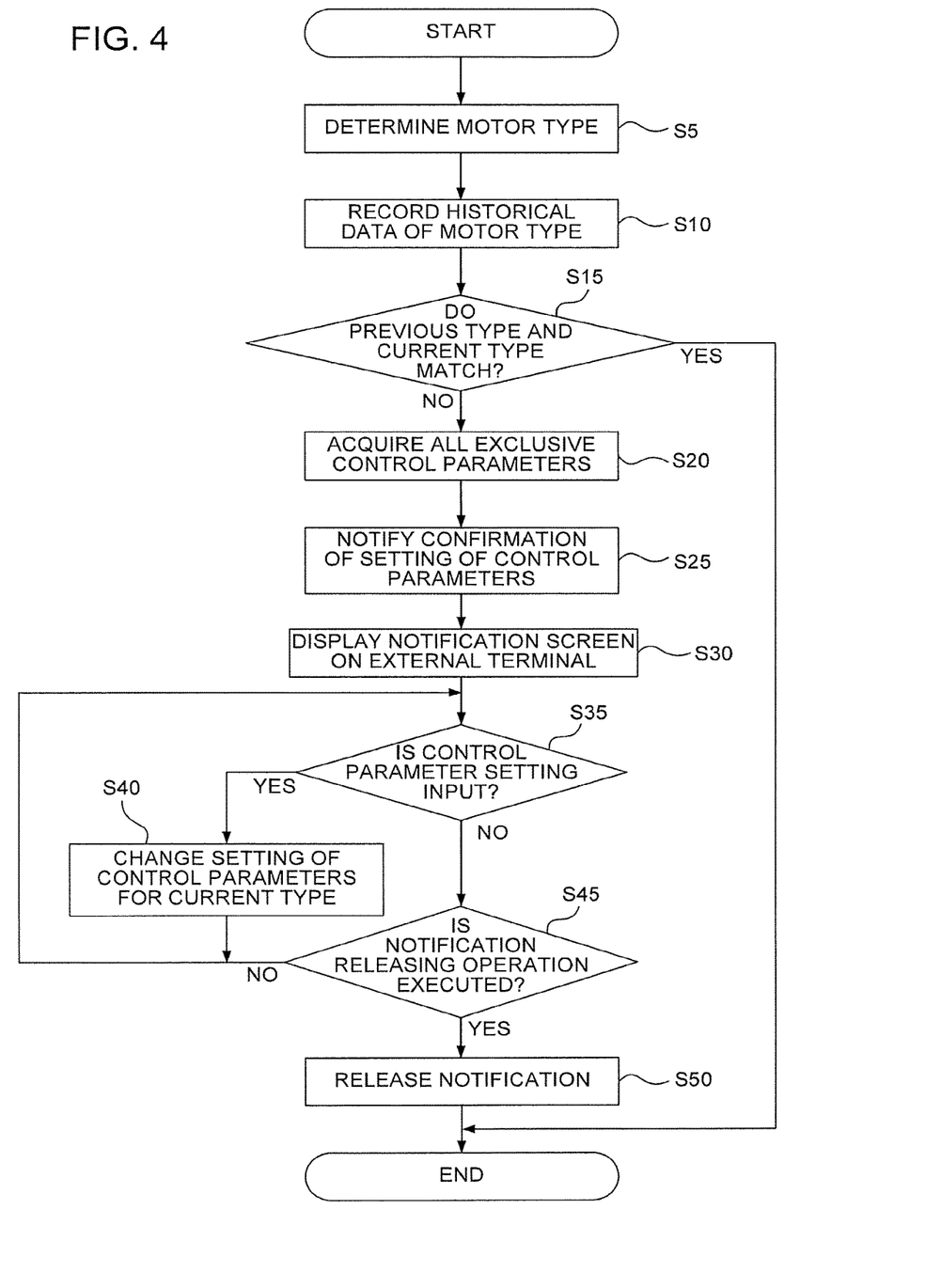
FIG. 4 is a flowchart representing control processes for a start-up process including a notification control, which is executed by the motor control circuit part.

As FIG. 4 shows, first in process S5, the motor control circuit part 23 determines the type of the motor 11 based on the signal received form the position detector 14 disposed in the motor 11. The processing process in process S5 functions as the motor type determination part 32.

In process S10, the motor control circuit part 23 records the motor type determined in the process S5 in the non-volatile memory as the historical information to be accumulated in accordance with the past chronological order. The processing process in process S10 functions as the memory control part 33.

In process S15, the motor control circuit part 23 compares the motor type currently determined in the process S5 with the previous motor type recorded in the non-volatile memory to determine whether or not they match. If the currently determined result matches the previously determined result, the determination is satisfied, and the process flow ends.

Meanwhile, if the currently determined result does not match the previously determined result, the determination is not satisfied. It is determined that the motor type has been changed, and the processing proceeds to process S20. The processing process in process S15 functions as the comparison determination part 34.

In process S20, the motor control circuit part 23 acquires the set values for all the exclusive control parameters adapted to the respective motor types.

In process S25, the motor control circuit part 23 notifies the user of necessity of setting confirmation of the exclusive control parameters by sounding the alarm, or the like. At this time, the power conversion control part 31 is controlled not to execute the power conversion control.

In process S30, the motor control circuit part 23 displays the motor type change notification screen (see FIG. 3) including the exclusive control parameters acquired in the process S20 on the display unit of the externally connected external terminal 13. The processing process in process S30 functions as the display control part (35a).

In process S35, the motor control circuit part 23 determines whether or not setting of the exclusive control parameters adapted to the motor type currently determined by the user has been input via the operation part of the external terminal 13. If the setting has been input, the determination is satisfied, and then the processing proceeds to process S40.

In process S40, the motor control circuit part 23 sets to change the set values of the exclusive control parameters for the current motor type determined that setting has been input in the process S35 (or initial input). Then the process returns to the process S35 where the similar processing process is repeatedly executed. The processing process in process S40 functions as the parameter setting part 37.

Meanwhile, if it is determined in the process S35 that the setting has not been input, the determination is not satisfied, and the process proceeds to process S45.

In process S45, the motor control circuit part 23 determines whether or not the release signal has been received from the external terminal 13, that is, whether or not the user has performed the notification releasing operation via the operation part of the external terminal 13. If the release signal has not been received from the external terminal 13, the determination is not satisfied, and the process returns to the process S35 where the similar processing process is repeatedly executed.

Meanwhile, if the release signal is received from the external terminal 13, the determination is satisfied, and the process then proceeds to process S50. The processing process in process S45 functions as the notification control releasing part 36.

In process S50, the motor control circuit part 23 deletes the motor type change notification screen displayed on the external terminal 13, and releases the notification control by controlling the power conversion control part 31 to allow execution of the power conversion control. Then the process flow ends.

The processing processes in processes S20, S25, S30, S35 and S50 function as the notification control part 35.

An exemplary hardware configuration will be described for the motor control circuit part 23 achieving the processes of the power conversion control part 31, the notification control part 35 implemented by a program executed by the CPU 901 described above, with reference to FIG. 5.

Figure 5:
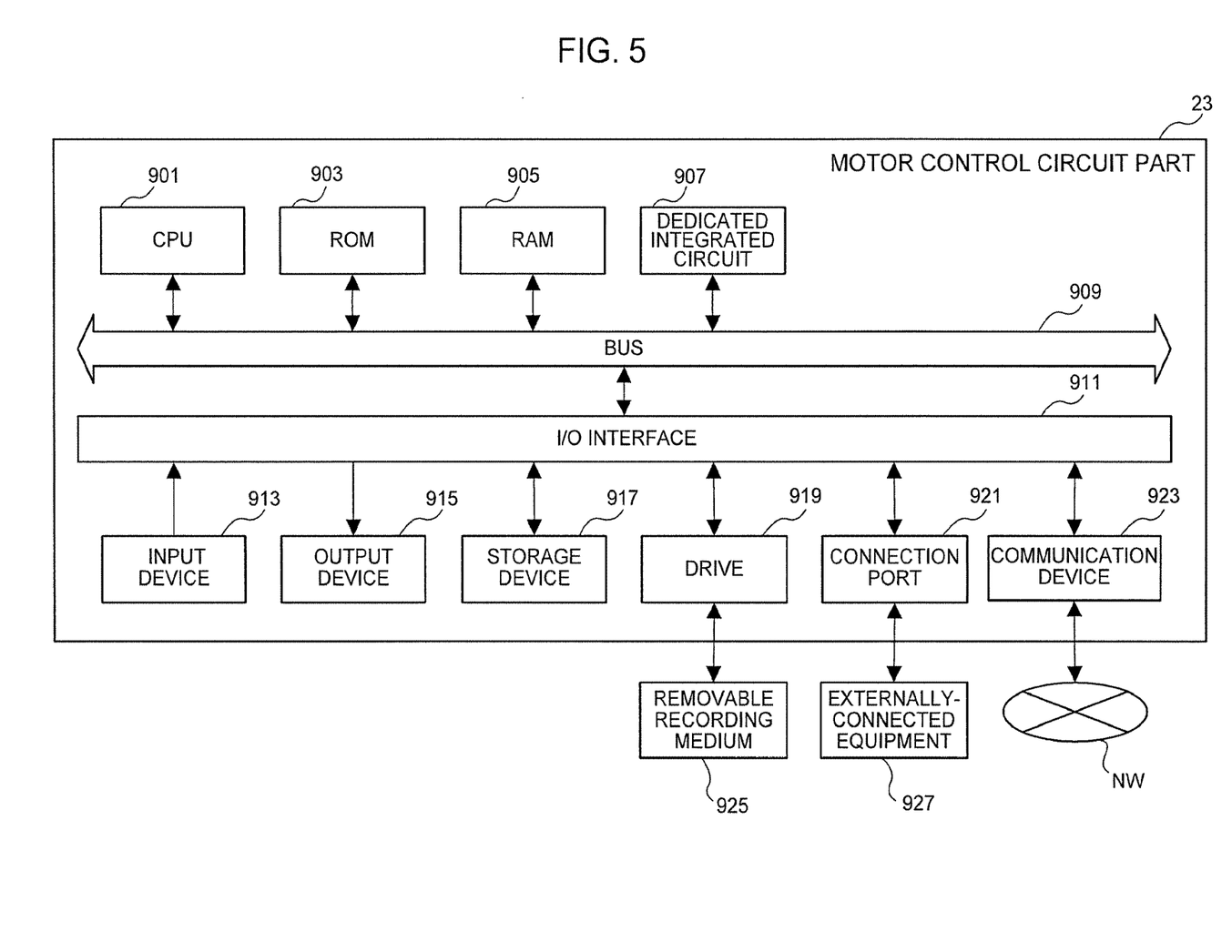
FIG. 5 is a block diagram showing an exemplary configuration of the motor control circuit part.

As shown in FIG. 5, the motor control circuit part 23 has, for example, a CPU 901 (calculation part), a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in a recording device such as the ROM 903, the RAM 905, and the storage device 917, for example.

The program can also temporarily or permanently be recorded in a removable recording medium 925 such as magnetic disks including flexible disks, various optical disks including CDs, MO disks, and DVDs, and semiconductor memories. The removable recording medium 925 as described above can be provided as so-called packaged software. In this case, the program recorded in the removable recording medium 925 may be read by the drive 919 and recorded in the recording device through the I/O interface 911 and the bus 909.

The program may be recorded in, for example, a download site, another computer, or another recording medium (not shown). In this case, the program is transferred through a network NW such as a LAN and the Internet and the communication device 923 receives this program. The program received by the communication device 923 may be recorded in the recording device through the I/O interface 911 and the bus 909.

The program may be recorded in appropriate externally-connected equipment 927, for example. In this case, the program may be transferred through the appropriate connection port 921 and recorded in the recording device through the I/O interface 911 and the bus 909.

The CPU 901 executes various processes in accordance with the program recorded in the recording device to implement the processes of the power conversion control part 31 and the notification control part 35. In this case, the CPU 901 may directly read and execute the program from the recording device or may be execute the program once loaded in the RAM 905. In the case that the CPU 901 receives the program through, for example, the communication device 923, the drive 919, or the connection port 921, the CPU 901 may directly execute the received program without recording in the recording device.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result to the communication device 923 or the connection port 921 as needed or may record the process result into the recording device or the removable recording medium 925.

As described above, the motor control apparatus 12 included in the motor control system 1 of the present embodiment determines the type of the motor 11 based on the signal received by the motor type determination part 32 from the position detector 14 of the motor 11. The notification control part 35 performs, at the notification part, notification about setting confirmation of the predetermined control parameters adapted to the type of the motor 11 determined by the motor type determination part 32. As a result, the motor control apparatus 12 of the present embodiment is allowed to prompt the user to confirm setting of the control parameters adapted to the type of the connected motor 11, thus avoiding the erroneous control.

In the present embodiment, the motor type determination part 32 determines the type of the motor 11 as either the rotation type or the linear motion type. There are the control parameters and the control program modules required for the respective controls of the rotation type and the linear motion type. Therefore, the motor type determination part 32 as described above may easily allow the motor control apparatus 12 to be shared to control the respective motor types.

The present embodiment includes the memory control part 33 which records the type of the motor 11 determined by the motor type determination part 32 in the non-volatile memory, and the comparison determination part 34 which makes a comparison between the current type of the motor 11 determined by the motor type determination part 32 and the previous type of the motor 11 recorded in the non-volatile memory for determination whether or not they match. The notification control part 35 provides notification upon determination by the comparison determination part 34 that those types of the motor 11 do not match. As a result, this makes it possible to particularly avoid application of the exclusive control parameters for the type different from that of the current motor 11, and application of the exclusive control parameters in the state where its contents are kept unset.

The present embodiment further includes the notification control releasing part 36 which releases the notification control performed by the notification control part 35 based on the release signal from the external terminal 13. As the notification control cannot be released unless the release signal is input by externally connecting the external terminal 13 structured separately from the motor control apparatus 12, the user is made conscious about the necessity of setting confirmation of the control parameters. This may perform the setting confirmation operation reliably.

In the present embodiment, the notification control part 35 includes the display control part (35a) which displays the exclusive control parameters with different contents among the predetermined control parameters, which are adapted to the respective types of the motor 11 on the display unit of the external terminal 13.

As described above, control of the motor 11 needs a large number of control parameters and the control program modules. Confirming setting of all the control parameters in response to frequent changes in the type of the motor 11 may become extremely complicated. It is significantly difficult to accurately identify the exclusive control parameter adapted to the type of the current motor 11 from all the control parameters.

On the contrary, the present embodiment is structured to perform notification by displaying the list containing only the exclusive control parameters required to be set, each of which has different contents (or required only by the pre-determined type) adapted to the type of the each motor 11 except the common control parameters shared by the respective types. As a result, this makes it possible to suppress the work load for confirming setting of the control parameters resulting from change in the type, thus improving workability and convenience of the user.

In the present embodiment, the display control part (35a) displays contents of the exclusive control parameters adapted to the type of the current motor 11 and the type of the previous motor 11, respectively in contrast on the display unit of the external terminal 13. This makes it possible to easily understand the correlation between the exclusive control parameters for the respective motor types before and after the change. As a result, this may identify the state of the exclusive control parameter whether it is not set, or it is uniquely set, thus simplifying operation for confirming the parameter setting.

The present embodiment includes the parameter setting part 37 which sets contents of the exclusive control parameters for the type of the current motor 11 (including correction of the past set contents). As a result, this allows the confirmation with respect to setting of the exclusive control parameter adapted to the type of the current motor 11 as well as input and correction of such contents in need.

Embodiments are not limited to those described above, but may be modified in various forms so long as it does not deviate from the scope and the technical concept.

For example, in the embodiment, the set values of the exclusive control parameters adapted to the motor type that has not been connected are not set, but the embodiment is not limited thereto, it is also possible to preliminarily set all the exclusive control parameters with de fact values upon factory shipment. In this case, the de fact value will be displayed with respect to the set values of the exclusive control parameters which have not been set by the user on the motor type change notification screen as shown in FIG. 3.

In the embodiment, the memory control part 33 records the historical information having all determination results of the motor type determined so far accumulated in chronological order in the non-volatile memory, but the embodiment is not limited thereto, for example, it is also possible to allow the memory control part 33 to record only the results of determination executed once in the non-volatile memory. For example, referring to the processing process of process S10 of the process flow as shown in FIG. 4, only in the case that the previous determination result in the non-volatile memory is cleared (no record exists), the current determination result is recorded in the non-volatile memory as the previous determination result. In such a case, the previous determination result matches the current determination result, which is determined that there is no change in the motor type. The notification, thus, is not performed. If the current determination result does not match the previous determination result recorded in the non-volatile memory, the motor type is changed and notification is performed. Thereafter upon notification releasing in the processing process of process S50 in response to the user's input for notification releasing operation, the notification control releasing part 36 will clear the previous determination result recorded in the non-volatile memory (or record replacement of the current determination result with the previous determination result in the non-volatile memory). This makes it possible to continuously perform the notification control unless the notification releasing is performed when power is turned on again under the notification control (before notification release). In other words, the comparison determination part 34 determines execution of the notification control at the timing when the previously determined motor type does not match the current motor type. It is also possible to make the determination with an algorithm other than the aforementioned one.

Each arrow shown in FIGS. 1, 2 and 5 represents an example of the signal flow and does not limit the signal flow direction.

The flowchart shown in FIG. 4 is not limited to the processing processes of illustrating the contents of the embodiment. It is possible to add or delete the processing process, change the order thereof, or the like, in the range with no deviation from the scope and technical concept.

Techniques by the embodiment and each modified example may be appropriately combined and utilized in addition to the examples having already described above.

Although exemplification is not performed one by one, the embodiment and each modified example are carried out by various changes being applied thereto without departing from the technical idea of the present invention.

According to one aspect of the invention, there is provided a motor control apparatus which controls driving of a motor including a position detector. The motor control apparatus includes a power conversion control part, a motor type determination part, and a notification control part. The power conversion control part controls power conversion of an inverter based on at least one predetermined control parameter. The motor type determination part determines a type of the motor based on a signal received from the position detector. The notification control part controls a notification part to notify about setting confirmation of the at least one predetermined control parameter in accordance with the type of the motor determined by the motor type determination part.

Obviously, numerous modifications and variations of the present invention are possible in light of the above teachings. It is therefore to be understood that within the scope of the appended claims, the invention may be practiced otherwise than as specifically described herein.

What is claimed is:

1. A motor control apparatus for controlling driving of a motor, comprising:
    an inverter configured to supply power to a motor comprising a position detector; and
    circuitry configured to control power conversion of the inverter based on at least one predetermined control parameter, determine a type of the motor based on a signal received from the position detector of the motor, and control notification of setting confirmation of the at least one predetermined control parameter in accordance with the type of the motor,
    wherein the circuitry is configured to determine the type of the motor from one of a rotation type and a linear motion type, and the circuitry comprises a non-volatile memory and is configured to record the type of the motor in the non-volatile memory, make comparison between a current type and a preceding type recorded in the non-volatile memory, determine whether the current type and the preceding type match, and control the notification when the current type and the preceding type do not match.

2. The motor control apparatus according to claim 1, wherein the circuitry is configured to release the notification based on a release signal received from an external terminal.

3. The motor control apparatus according to claim 2, wherein the circuitry is configured to control display of exclusive control parameters including different contents corresponding to types of motors respectively among the at least one predetermined control parameters.

4. The motor control apparatus according to claim 3, wherein the circuitry is configured to control the display of the contents of the exclusive control parameters respectively corresponding to the current type and the preceding type in contrast.

5. The motor control apparatus according to claim 4, wherein the circuitry is configured to set the contents of the exclusive control parameter for the current type.

6. The motor control apparatus according to claim 5, further comprising:
    a converter configured to covert AC power fed from an AC power supply into DC power and comprising a rectification circuit and a smoothing circuit.

7. The motor control apparatus according to claim 1, further comprising:
    a converter configured to covert AC power fed from an AC power supply into DC power and comprising a rectification circuit and a smoothing circuit.

8. The motor control apparatus according to claim 2, further comprising:
    a converter configured to covert AC power fed from an AC power supply into DC power and comprising a rectification circuit and a smoothing circuit.

9. The motor control apparatus according to claim 3, further comprising:
    a converter configured to covert AC power fed from an AC power supply into DC power and comprising a rectification circuit and a smoothing circuit.

10. The motor control apparatus according to claim 4, further comprising:
    a converter configured to covert AC power fed from an AC power supply into DC power and comprising a rectification circuit and a smoothing circuit.

11. A motor control system, comprising:
    a motor comprising a position detector;
    a motor control apparatus configured to control driving of the motor and comprising an inverter and circuitry; and
    an external terminal externally connected to the motor control apparatus and configured to output a release signal which releases notification,
    wherein the inverter is configured to supply power to the motor having the position detector, and the circuitry is configured to control power conversion of the inverter based on at least one predetermined control parameter, determine a type of the motor based on a signal received from the position detector of the motor, and control the notification of setting confirmation of the at least one predetermined control parameter in accordance with the type of the motor,
    wherein the circuitry is configured to determine the type of the motor from one of a rotation type and a linear motion type, and the circuitry comprises a non-volatile memory and is configured to record the type of the motor in the non-volatile memory, make comparison between a current type and a preceding type recorded in the non-volatile memory, determine whether the current type and the preceding type match, and control the notification when the current type and the preceding type do not match.

12. The motor control system according to claim 11, wherein the circuitry is configured to release the notification based on a release signal received from an external terminal.

13. The motor control system according to claim 12, wherein the circuitry is configured to control display of exclusive control parameters including different contents corresponding to types of motors respectively among the at least one predetermined control parameters.

14. A motor control method for controlling driving of a motor, comprising:

controlling power conversion of an inverter based on at least one predetermined control parameter;

determining a type of a motor based on a signal received from a position detector of the motor; and controlling notification of setting confirmation of the at least one predetermined control parameter in accordance with the type of the motor determined;

recording, in a non-volatile memory, the type of the motor determined;

making comparison between a current type and a preceding type recorded in the non-volatile memory;

determining whether the current type and the preceding type match; and controlling the notification when the current type and the preceding type do not match, wherein the inverter is configured to supply power to the motor comprising the position detector, and the determining of the type of the motor comprises determining the type of the motor from one of a rotation type and a linear motion type.

15. The motor control method according to claim 14, further comprising:

releasing the notification based on a release signal received from an external terminal.

16. The motor control method according to claim 15, wherein the controlling of the notification comprises controlling display of exclusive control parameters including different contents corresponding to types of motors respectively among the at least one predetermined control parameters.

17. The motor control method according to claim 16, wherein the controlling of the display comprises controlling the display of the contents of the exclusive control parameters respectively corresponding to the current type and the preceding type in contrast.

18. The motor control method according to claim 17, further comprising:

setting the contents of the exclusive control parameter for the current type of the motor.

* * * * *